(12) United States Patent
Campan et al.

(10) Patent No.: US 9,927,246 B2
(45) Date of Patent: Mar. 27, 2018

(54) METHOD, APPARATUS AND COMPUTER PROGRAM PRODUCT FOR PROVIDING NAVIGATION INFORMATION IN RELATION TO AUGMENTED REALITY GUIDANCE

(71) Applicant: HERE Global B.V., Eindhoven (NL)

(72) Inventors: Marius Campan, Berlin (DE); Igor Delitsyn, Berlin (DE); Michal Jagoda, Berlin (DE); Johannes Koblenz, Berlin (DE)

(73) Assignee: HERE Global B.V., Eindhoven (NL)

( * ) Notice: Subject to any disclaimer, the term of this patent is extended or adjusted under 35 U.S.C. 154(b) by 9 days.

(21) Appl. No.: 14/722,913

(22) Filed: May 27, 2015

(65) Prior Publication Data

US 2016/0349062 A1 Dec. 1, 2016

(51) Int. Cl.
| | |
|---|---|
| *G01C 21/26* | (2006.01) |
| *G06T 19/00* | (2011.01) |
| *G01C 21/28* | (2006.01) |
| *G01C 21/20* | (2006.01) |
| *G01C 21/36* | (2006.01) |

(52) U.S. Cl.
CPC .......... *G01C 21/265* (2013.01); *G01C 21/20* (2013.01); *G01C 21/26* (2013.01); *G01C 21/28* (2013.01); *G01C 21/365* (2013.01); *G01C 21/3647* (2013.01); *G06T 19/006* (2013.01)

(58) Field of Classification Search
CPC ...... G01C 21/265; G01C 21/26; G01C 21/28; G01T 19/006
USPC .......................................................... 701/454
See application file for complete search history.

(56) References Cited

U.S. PATENT DOCUMENTS

| | | | |
|---|---|---|---|
| 2009/0125234 A1* | 5/2009 | Geelen ............... | G01C 21/3647 701/533 |
| 2010/0035637 A1 | 2/2010 | Varanasi et al. | |
| 2011/0313653 A1 | 12/2011 | Lindner | |
| 2013/0328867 A1 | 12/2013 | Jung et al. | |
| 2015/0109334 A1* | 4/2015 | Park ........................ | G06F 3/048 345/633 |

OTHER PUBLICATIONS

European Search Report for Application No. EP 16 16 9879 dated Oct. 11, 2016.

* cited by examiner

*Primary Examiner* — Anne M Antonucci
(74) *Attorney, Agent, or Firm* — Alston & Bird LLP (57) ABSTRACT

A method, apparatus and computer program product are provided to provide navigational information in conjunction with augmented reality guidance. In the context of a method, the position of a mobile terminal is determined. The method also includes determining an orientation of the mobile terminal. Based at least in part upon the position and orientation of the mobile terminal and map data associated therewith, the method further includes providing for augmentation of a display of at least a portion of an image associated with the position. The method provides for augmentation of the display of at least the portion of the image by causing navigational information to be presented upon a sidewall surface of a structure within the image. A corresponding apparatus and computer program product are also provided.

15 Claims, 4 Drawing Sheets

METHOD, APPARATUS AND COMPUTER PROGRAM PRODUCT FOR PROVIDING NAVIGATION INFORMATION IN RELATION TO AUGMENTED REALITY GUIDANCE

TECHNOLOGICAL FIELD

An example embodiment relates generally to augmented reality guidance and, more particularly, to a method, apparatus and computer program product for providing navigational information in conjunction with augmented reality guidance.

BACKGROUND

Augmented reality guidance provides a visual representation of a location, such as a visual representation of the current surroundings about a user, with directional information superimposed or otherwise provided in conjunction with the visual representation of the respective location. The directional information may include an indication of the perceived location of the user and arrows originating from the indication of the location of the user and indicating the direction in which the user should travel in order a reach a predefined destination.

Unfortunately, the accuracy of the positioning technology, such as a global positioning system (GPS), that is utilized to determine the location of the user and the orientation of the user relative to the current surroundings is relatively low in comparison to the accuracy of the visual representation of the respective location. As such, the navigational information, such as the indication of the location of the user and a directional arrow indicating the direction of travel on the user, may be misaligned or otherwise inaccurate relative to the visual representation of the respective location. For example, a user who is standing on or walking along a sidewalk may be determined by the positioning technology to be, not on the sidewalk, but in the street. Similarly, the directional arrow indicating the direction of travel of the user may be displaced from the actual location of the user and/or may point in a direction that is not aligned with the visual representation of the streets and/or sidewalks, thereby potentially leading to confusion on behalf of the user. The relatively low accuracy of the positioning technology may also cause other unintended effects, such as by causing directions to be provided that unnecessarily direct so user to cross the street one or multiple times as a result of the difficulty in pin pointing the location of the user relative to the street.

BRIEF SUMMARY

A method, apparatus and computer program product are provided in accordance with an example embodiment in order to provide navigation information in conjunction with augmented reality guidance. In an example embodiment, the navigation information is presented in a manner that is both intuitive to a user and provides a more accurate representation of the navigation information. As such, a user may more reliably rely upon the navigation information presented in conjunction with the augmented reality guidance, such as provided by an augmented reality navigation application.

In an example embodiment, a method is provided that includes determining a position of a mobile terminal and determining an orientation of the mobile terminal. Based at least in part upon the position and orientation of the mobile terminal and map data associated therewith, the method also includes providing for augmentation of a display of at least a portion of an image associated with the position. In this regard, the method provides for augmentation of the display of at least the portion of the image by causing navigational information to be presented upon a sidewall surface of a structure within the image.

The method of an example embodiment also includes determining whether the orientation of the mobile terminal has changed to a different orientation. In an instance in which the orientation of the mobile terminal has changed, the method of this example embodiment also includes providing for augmentation of the display of a different portion of the image captured by the mobile terminal based at least in part upon the different orientation of the mobile terminal.

The method of an example embodiment also includes determining that the position of the mobile terminal has changed to a different position. The method of this example embodiment also includes providing for augmentation of the display of at least a portion of the image captured by the mobile terminal at the different position by causing the navigational information to be presented upon the sidewall surface of the structure within the image captured by the mobile terminal at the different position.

The method of an example embodiment causes navigational information to be presented upon the sidewall surface of the structure within the image by causing a directional arrow or a sign to be presented upon the sidewall surface of the structure within the image. In this example embodiment, the method causes the directional arrow or the sign to be presented upon the sidewall surface of the structure within the image by causing a perspective view of the directional arrow or the sign to be presented upon the sidewall surface of the structure within the image. The method of an example embodiment causes navigational information to be presented upon the sidewall surface of the structure within the image by causing navigational information to be presented a predefined distance above street level upon the sidewall surface of the structure within the image. In an example embodiment, the method causes navigational information to be presented upon the sidewall surface of the structure within the image by causing navigational information to be presented upon the sidewall surface of a building within the image. In this example embodiment, the building is laterally offset to a side of a street within the image.

In another example embodiment, an apparatus is provided that includes at least one processor and at least one memory including computer program code with the memory and computer program code being configured to, with the processor, cause the apparatus to determine a position of a mobile terminal and determine an orientation of the mobile terminal. Based at least in part upon the position and orientation of the mobile terminal and map data associated therewith, the memory and the computer program code are also configured to, with the processor, cause the apparatus to provide for augmentation of a display of at least a portion of an image associated with the position. In this regard, the memory and the computer program code are configured to, with the processor, cause the apparatus to provide for augmentation of the display of at least the portion of the image by causing navigational information to be presented upon a sidewall surface of a structure within the image.

The memory and the computer program code are further configured to, with the processor, cause the apparatus of an example embodiment to determine whether the orientation of the mobile terminal has changed to a different orientation.

In an instance in which the orientation of the mobile terminal has changed, the memory and the computer program code are further configured to, with the processor, cause the apparatus of this example embodiment to provide for augmentation of the display of a different portion of the image captured by the mobile terminal based at least in part upon the different orientation of the mobile terminal.

The memory and the computer program code are further configured to, with the processor, cause the apparatus of an example embodiment to determine that the position of the mobile terminal has changed to a different position. The memory and the computer program code are further configured to, with the processor, cause the apparatus of this example embodiment to provide for augmentation of the display of at least a portion of the image captured by the mobile terminal at the different position by causing the navigational information to be presented upon the sidewall surface of the structure within the image captured by the mobile terminal at the different position.

The memory and the computer program code are configured to, with the processor, cause the apparatus of an example embodiment to cause navigational information to be presented upon the sidewall surface of the structure within the image by causing a directional arrow or a sign to be presented upon the sidewall surface of the structure within the image. In this example embodiment, the memory and the computer program code may be configured to, with the processor, cause the apparatus to cause the directional arrow or the sign to be presented upon the sidewall surface of the structure within the image by causing a perspective view of the directional arrow or the sign to be presented upon the sidewall surface of the structure within the image.

The memory and the computer program code are configured to, with the processor, cause the apparatus of an example embodiment to cause navigational information to be presented upon the sidewall surface of the structure within the image by causing navigational information to be presented a predefined distance above street level upon the sidewall surface of the structure within the image. The memory and the computer program code are configured to, with the processor, cause the apparatus of an example embodiment to cause navigational information to be presented upon the sidewall surface of the structure within the image by causing navigational information to be presented upon the sidewall surface of a building within the image. In this example embodiment, the building is laterally offset to a side of a street within the image.

In a further example embodiment, a computer program product is provided that includes at least one non-transitory computer readable medium having program code portions stored thereon with the program code portions being configured, upon execution, to determine a position of a mobile terminal and determine an orientation of the mobile terminal. Based at least in part upon the position and orientation of the mobile terminal and map data associated therewith, the program code portions of this example embodiment are also configured, upon execution, to provide for augmentation of a display of at least a portion of an image associated with the position. In this example embodiment, the program code portions configured to provide for augmentation of the display of at least the portion of the image include program code portions configured to cause navigational information to be presented upon a sidewall surface of a structure within the image.

The program code portions of an example embodiment are further configured, upon execution, to determine whether the orientation of the mobile terminal has changed to a different orientation. In an instance in which the orientation of the mobile terminal has changed, the program code portions of this example embodiment are additionally configured to provide for augmentation of the display of a different portion of the image captured by the mobile terminal based at least in part upon the different orientation of the mobile terminal.

The program code portions of an example embodiment are also configured, upon execution, to determine that the position of the mobile terminal has changed to a different position. The program code portions of this example embodiment are further configured, upon execution, to provide for augmentation of the display of at least a portion of the image captured by the mobile terminal at the different position by causing the navigational information to be presented upon the sidewall surface of the structure within the image captured by the mobile terminal at the different position.

In an example embodiment, the program code portions configured to cause navigational information to be presented upon the sidewall surface of the structure within the image include program code portions configured to cause a directional arrow or a sign to be presented upon the sidewall surface of the structure within the image. In this example embodiment, the program code portions configured to cause the directional arrow or the sign to be presented upon the sidewall surface of the structure within the image include program code portions configured to cause a perspective view of the directional arrow or the sign to be presented upon the sidewall surface of the structure within the image. In an example embodiment, the program code portions configured to cause navigational information to be presented upon the sidewall surface of the structure within the image include program code portions configured to cause navigational information to be presented a predefined distance above street level upon the sidewall surface of the structure within the image.

In yet another example embodiment, an apparatus is provided that includes means for determining a position of a mobile terminal, means for matching map data with an image associated with the position and means for determining an orientation of the mobile terminal. Based at least in part upon the orientation of the mobile terminal, the apparatus also includes means for providing for augmentation of a display of at least a portion of the image captured by the mobile terminal. In this regard, the means for providing for augmentation of the display of at least the portion of the image include means for causing navigational information to be presented upon a sidewall surface of a structure within the image.

BRIEF DESCRIPTION OF THE DRAWINGS

Having thus describing example embodiments of the present invention in general terms, reference will now be made to the accompanying drawings, which are necessarily drawn to scale, and wherein.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment in order to cause the display of an image that has been augmented with navigational information, thereby providing for augmented reality guidance. In this regard, the images are augmented with navigational information in a manner that may reduce the deleterious impact of inaccuracies with respect to the positioning technology, while concurrently causing the navigational information to be presented in a manner that is intuitive to a user. As described below, for example, the navigational information is presented upon the sidewall surface of a structure, such as a building or other three-dimensional structure, within the image such that any inaccuracies with respect to the positioning technology may cause the navigational information to be slightly modified with respect to its presentation upon the sidewall surface of the structure, but not in a manner that is disconcerting or confusing to the user.

The apparatus of example embodiment may be embodied by a variety of different types of computing devices. For example, the apparatus may be embodied by a mobile terminal, such as a personal digital assistant (PDA), mobile telephone, smart phone, companion device, for example, a smart watch, pager, mobile television, gaming device, laptop computer, camera, tablet computer, touch surface, video recorder, audio/video player, radio, electronic book or any combination of the aforementioned, and other types of voice and text communications systems. Alternatively, the computing device may be a fixed computing device, such as a personal computer, a desktop computer, a computer workstation, a server or the like, that communicates with a mobile terminal carried by a user so as to receive information regarding the position and orientation of the mobile terminal and to provide for augmentation of a display of an image with navigational information for presentation by the mobile terminal.

Figure 1:
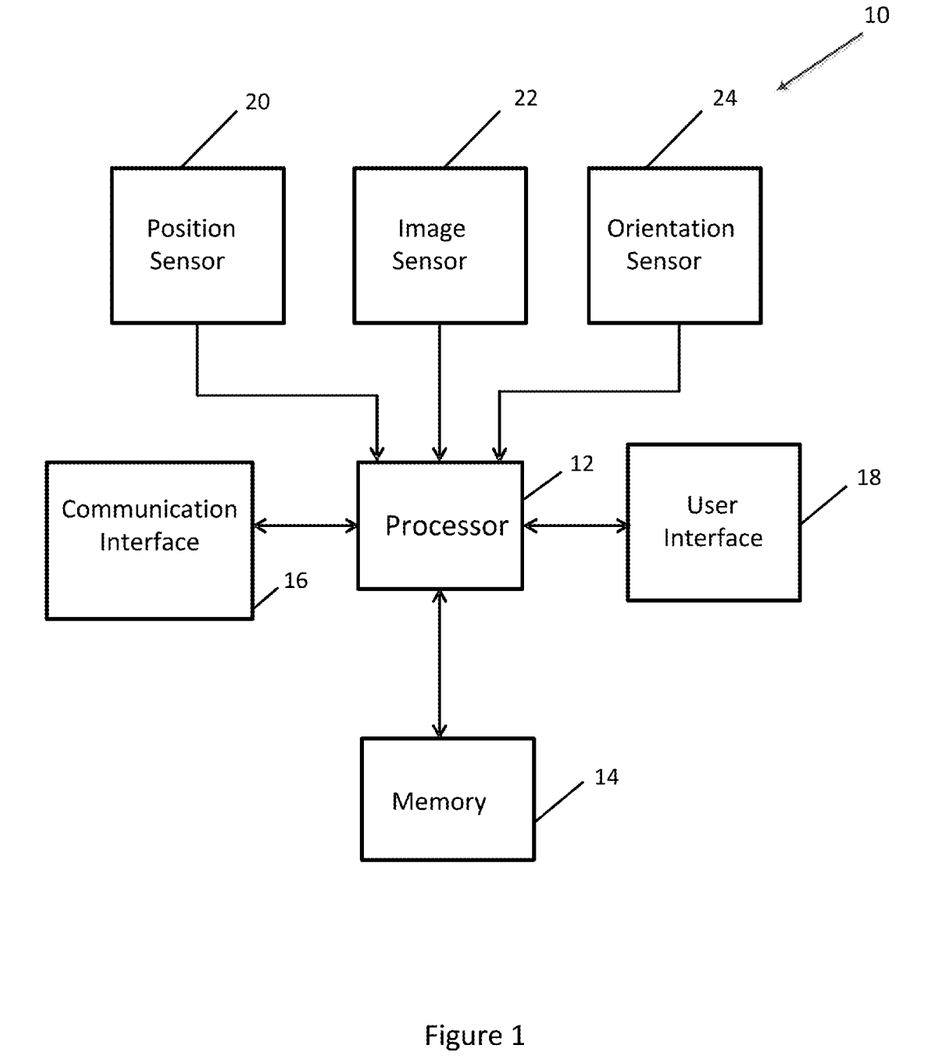
FIG. 1 is block diagram of an apparatus that may be specifically configured in accordance with an example embodiment of the present invention.

Regardless of the type of computing device that embodies the apparatus, the apparatus 10 may include or otherwise be associated with includes, is associated with or is otherwise in communication with a processor 12, a memory device 14 and a communication interface 16. In an embodiment in which the apparatus is embodied by the mobile terminal, the apparatus may also include, be associated with or otherwise be in communication with a user interface 18, a position sensor 20, an image sensor 22 and an orientation sensor 24.

In some embodiments, the processor 12 (and/or co-processors or any other processing circuitry assisting or otherwise associated with the processor) may be in communication with the memory device 14 via a bus for passing information among components of the apparatus 10. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 10 may be embodied by a computing device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 10 of an example embodiment also includes a communication interface 16 that may be any means such as a device or circuitry embodied in either hardware or a combination of hardware and software that is configured to receive and/or transmit data from/to other electronic devices in communication with the apparatus, such as the mobile terminal in an embodiment in which the apparatus is embodied by a computing device that is remote from the mobile terminal. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

In an embodiment in which the apparatus 10 is embodied by a mobile terminal, the apparatus may also optionally include or otherwise be in communication with a user interface 18. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 12 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 14 and/or the like).

In an embodiment in which the apparatus 10 is embodied by a mobile terminal, the apparatus may also include a position sensor 20, an image sensor 22 and an orientation sensor 24. The position sensor may be embodied in various manners so as to determine the position of the mobile terminal as described below. For example, the position sensor may be embodied by a GPS receiver. However, the position sensor may be embodied in other manners in other embodiments.

With respect to the image sensor 22, the apparatus 10 embodied by a mobile terminal may include an image sensor in the form of a camera or other media capturing element in order to capture images or video of objects, people, and places proximate to the user of the mobile terminal. However, the apparatus including an apparatus embodied by a mobile terminal may alternatively practice example embodiments in connection with images or video content that are produced or generated elsewhere, but are available for consumption or presentation at the mobile terminal.

The orientation sensor 24 may be embodied in various manners so as to determine the orientation of the mobile terminal as described below. For example, the orientation sensor may be embodied by a magnetometer, an accelerometer, a gyroscope or the like. However, the position sensor may be embodied in other manners in other embodiments.

Figure 2:
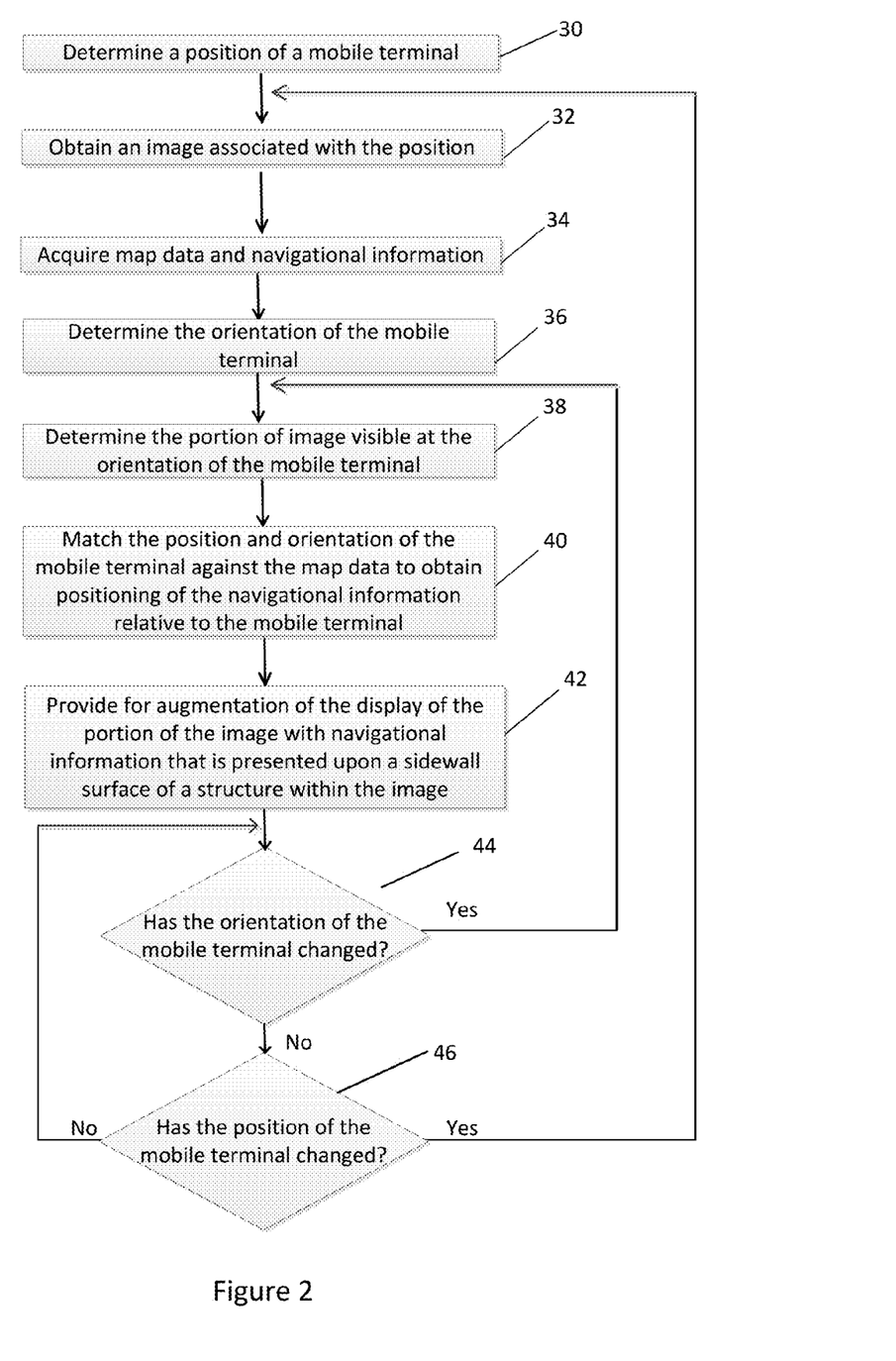
FIG. 2 is a flowchart illustrating operations performed, such as by the specifically configured apparatus of FIG. 1, in accordance with an example embodiment of the present invention.

Referring now to FIG. 2, the operations performed, such as by a specifically configured apparatus 10 of FIG. 1, are depicted. As shown in block 30 of FIG. 2, the apparatus may include means, such as the processor 12, the position sensor 20 or the like, for determining the position of the mobile terminal, such as the actual or absolute position or a relative position. In an embodiment in which apparatus is embodied by a computing device remote from the mobile terminal, the apparatus, such as the processor, may determine the position of the mobile terminal based upon positional information provided by the mobile terminal, such as provided by the position sensor of the mobile terminal.

In an example embodiment, the apparatus includes means, such as the processor 12, the image sensor 22 or the like, for obtaining an image associated with the position of the mobile terminal, such as an image captured at the position of the mobile terminal. See block 32. In an embodiment in which the apparatus is embodied by the mobile terminal, the apparatus may be configured such that the image sensor captures an image at the position of the mobile terminal. For example, the image sensor may capture an image and the processor may concurrently determine the position of the mobile terminal at the time at which the image was captured. Alternatively, in an embodiment in which the apparatus is embodied by a computing device remote from the mobile terminal, the apparatus may be configured to obtain an image at the position of the mobile terminal, such as by receiving an image from the image sensor of the mobile terminal or by retrieving an image from memory 14 or from another storage device with the image being associated with the position of the mobile terminal.

As shown in block 34, the apparatus 10 also includes means, such as the processor 12, the memory 14 or the like, for acquiring map data, such as from local memory or an off board memory device, such as a server, cloud storage or the like. The map data is associated with the position of the terminal and, in an example embodiment, includes map data of a region of a predetermined size or a predetermined area about, such as centered about, the position of a mobile terminal. In addition, the apparatus of this example embodiment includes means, such as the processor, the memory or the like, for acquiring navigational information. In this regard, the navigational information may have been generated, such as by the processor or by a navigational application, to provide directions, such as step-by-step directions, relative to the map data from the current position of the mobile terminal to an predefined destination, such as a predefined destination identified by the user, such as via the user interface 18 of the mobile terminal. For example, the navigational information may be provided in terms of the street names and the relative orientation and spacing of the streets to one another as defined by the map data.

As shown in block 36, the apparatus 10 also includes means, such as the orientation sensor 24, the processor 12 or the like, for determining the orientation of the mobile terminal. In an embodiment in which apparatus is embodied by a computing device remote from the mobile terminal, the apparatus, such as the processor, may determine the orientation of the mobile terminal based upon orientation information provided by the mobile terminal, such as provided by the orientation sensor of the mobile terminal.

Based upon the position of the mobile terminal and the orientation of the mobile terminal at that position, the apparatus 10 of an example embodiment also includes means, such as a processor 12 or the like, for determining the portion of the image associated with the position of the mobile terminal, such as the image captured by the image sensor 22 of the mobile terminal at the position or an image retrieved from a storage device that is associated with the position of the mobile terminal, that would be visible. See block 38 of FIG. 2. For example, the image may include a wide expanse of the street scape, but the orientation of the mobile terminal may indicate that the mobile terminal and, in turn, the user is facing in a particular direction such that only a portion of the image would be visible.

Based at least in part upon the position and orientation of the mobile terminal, the apparatus 10 also includes means, such as the processor 12, the user interface 18 or the like, for providing for augmentation of the display of at least a portion of the image at the position of the mobile terminal, such as the portion of the image that is determined to be visible at the position and the orientation of the mobile terminal. See block 42 of FIG. 2. In this regard, the apparatus, such as the processor, is configured to provide for augmentation of the display of at least the portion of the image that is determined to be visible at the orientation of the mobile terminal by causing navigational information to be presented upon a sidewall surface of a structure, such as a building, within the image. In regards to providing for augmentation of the display, in an embodiment in which the apparatus is embodied by the mobile terminal, the apparatus, such as the processor, may be configured to augment the display of the image that is presented by the user interface 18 with the navigational information, while in an embodiment in which the apparatus is embodied by a computing device remote from the mobile terminal, the apparatus, such as the processor, may be configured to provide direction to the mobile terminal regarding the manner in which the image is to be augmented with the navigational information.

The apparatus 10, such as the processor 12 or the user interface 18, of this example embodiment is configured to provide for augmentation of the display of at least a portion of the image at the position of the mobile terminal based upon map data associated with the position of the mobile terminal and, in one embodiment, map data associated with the position and orientation of the mobile terminal. See also block 42. Prior to the augmentation of the image, the apparatus of an example embodiment also includes means, such as the processor or the like, for matching the position and orientation of the mobile terminal against the map data, thereby correlating the navigational information to the mobile terminal and, in turn, to the image associated with the position of the mobile terminal. See block 40. In this regard, by determining the position and orientation of the mobile terminal with respect to the map data, the apparatus, such as the processor, is configured to position the navigational information that is provided relative to the map data with respect to the mobile terminal and, more particularly, with respect to the image associated with the location of the mobile terminal. For example, in an instance in which the image includes a plurality of structures, such as a plurality of buildings, store fronts, houses or the like, built along a street, the apparatus, such as the processor, is configured to correlate the navigational information to the street and, more specifically, to the structures alongside the street based upon the correlation of the map data and, in turn, the navigational information to the position and orientation of the mobile terminal and, more particularly, to the image associated with the location of the mobile terminal. As such, the navigational information that is defined in terms of the map data may be correspondingly correlated to or associated with the image, including the structures in the image.

Figure 3:
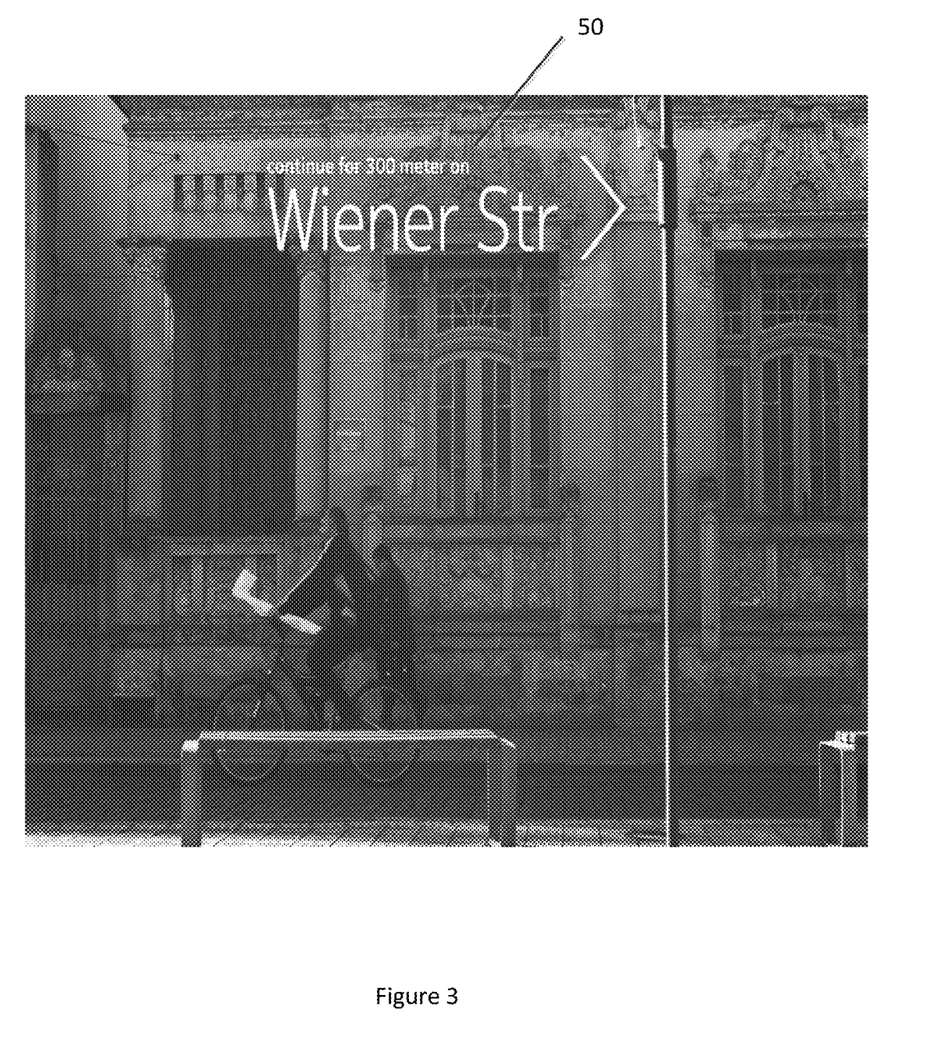
FIG. 3 illustrates the display of an image including a structure that has been augmented with navigational information presented upon a sidewall surface of the structure in accordance to an example embodiment of the present invention.
Figure 4:
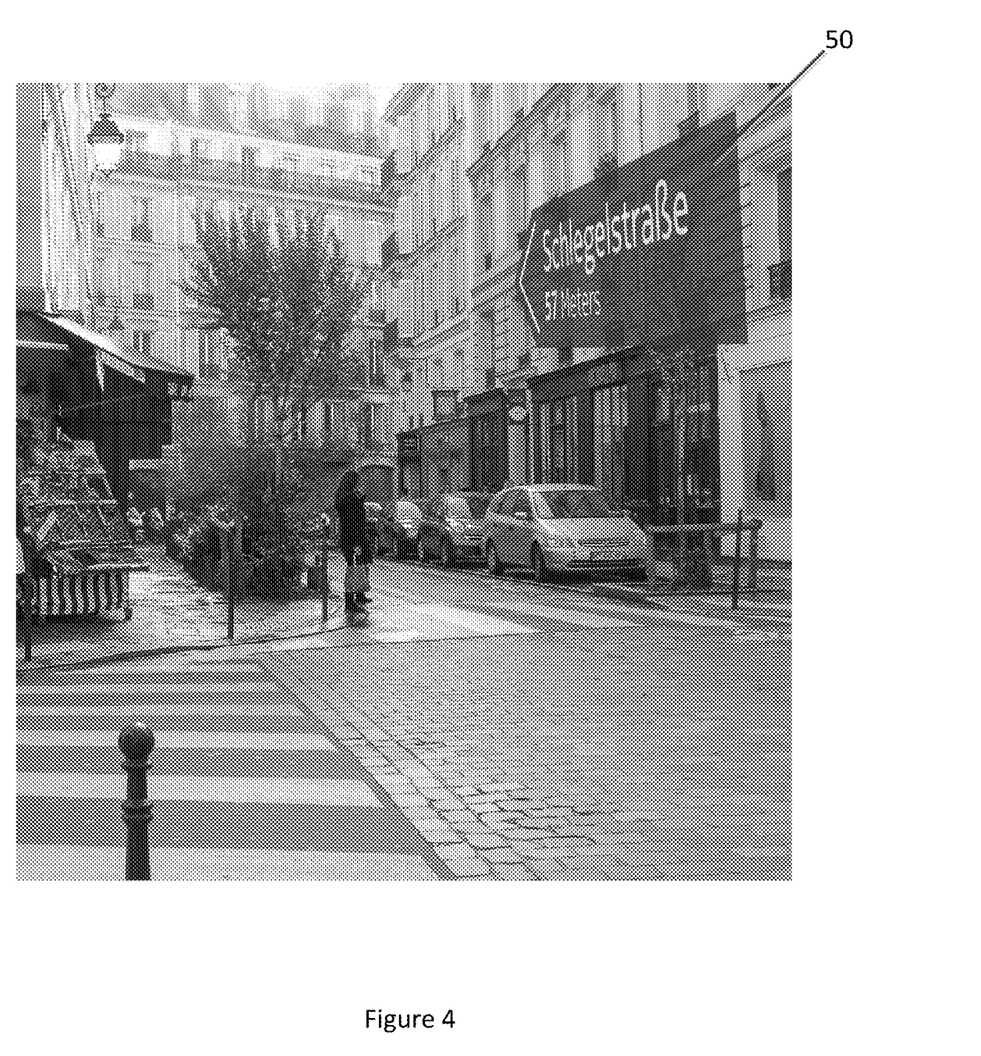
FIG. 4 illustrates the display of an image including a structure that has been augmented with navigational information presented upon a sidewall surface of the structure in accordance to an example embodiment of the present invention.

Various types of navigational information may be presented upon the sidewall surface of a structure within the image. In an example embodiment, the navigational information may include a directional arrow or sign 50, such as shown in FIGS. 3 and 4, that is presented upon the sidewall surface of the structure within the image. In this example embodiment, the directional arrow or the sign that is presented upon the sidewall surface of the structure within the image is presented in a perspective view with the directional arrow or sign having gradually reduced dimensions as the directional arrow or sign becomes further removed from the position of the mobile terminal. In this regard, the apparatus 10 of an example embodiment also includes means, such as the processor 12, the user interface 18 of the like, for causing a perspective view of the directional arrow or the sign to be presented upon the sidewall surface of the structure within the image.

The apparatus 10 of an example embodiment also includes means, such as the processor 12, user interface 18 or the like, for causing navigational information to be presented a predefined distance above street level, such as two meters above street level, upon the sidewall surface of the structure within the image. As such, the navigational information is readily visible to the user. Moreover, by spacing the navigational information from the street or the sidewalk and also from the location of the user, any inaccuracies in the positioning technology will have much less impact. For example, a directional arrow or sign that is disoriented by a few degrees still appears to generally point in the correct direction when presented upon a sidewall surface of a structure within the image.

As shown in FIGS. 3 and 4, the apparatus 10 of an example embodiment may also include means, such as the processor 12, the user interface 18 or the like, for causing navigational information to be presented upon the sidewall surface of a building within the image. In this regard, the building is laterally offset to a side of the street within the image. Thus, a user may rely upon the navigational information presented upon the sidewall surface of the structure in order to proceed toward an intended destination with any inaccuracies in the positioning technology having less, if any, effect upon the user's understanding of the navigational information.

The apparatus 10 of an example embodiment is also configured to update the image that is presented and/or the navigational information that is presented based upon changes in the orientation and position of the mobile terminal. In an example embodiment, the apparatus also includes means, such as the processor 12, the orientation sensor 24 or the like, for determining whether the orientation the mobile terminal has changed to a different orientation. See block 44. In an example embodiment, the apparatus, such as the processor, is configured to only determine that the orientation of the mobile terminal has changed in an instance in which the orientation the mobile terminal has changed by at least a predefined amount, thereby avoiding changes in the image that is presented in response to very minor and insignificant changes in an orientation. However, in an instance in which the orientation is mobile terminal is determined to have changed, such as to have changed by more than the predefined amount, the apparatus of this example embodiment includes means, such as the processor, the user interface 18 or the like, for providing for augmentation of the display of a different portion of the image captured by the mobile terminal based at least in part upon the different orientation of mobile terminal. For example, in an instance in which the orientation in mobile terminal has changed, the portion of the image that is visible to a user of the mobile terminal at the new orientation may be determined to be a different portion of the image with the display of this different portion of the image being augmented based upon the different orientation of the mobile terminal. See blocks 40 and 42 of FIG. 2.

In an example embodiment, the apparatus 10, such as the image sensor 22, is configured to repeatedly capture signals. In order to reduce the impact of any errors, such as jitter, that accumulates in the output of the orientation sensor 24, the apparatus, such as the processor 12, of an example embodiment is configured to compare the images captured at different instances in time and to determine the change in orientation of the mobile terminal based thereupon. This change in orientation is then compared by the apparatus, such as the processor, to the change in orientation identified by the orientation sensor. In an instance in which the different measures of the change in orientation are within a predefined range of one another, the orientation sensor is considered to be properly measuring the orientation. However, in an instance in which the different measures of the change in orientation differ by more than a predefined threshold, the change in orientation as defined by a comparison of the images is considered to be accurate and the orientation sensor may be reset or recalibrated so as to reduce the error, e.g., jitter, in the output of the orientation sensor.

Additionally or alternatively, the apparatus 10 of an example embodiment also includes means, such as the processor 12, the position sensor 20 or the like, for determining that the position of the mobile terminal has changed to a different position. See block 46. In this regard, the apparatus, such as the processor, of an example embodiment may be configured to only determine that the position of the mobile terminal has changed in an instance in which the position of mobile terminal has changed by at least a predefined amount, thereby avoiding changes to the display the mobile terminal including changes to the image being presented and/or the navigational information with which the image is augmented for very small and insignificant changes in position. However, in an instance in which the position in mobile terminal has changed, such as by at least the predefined amount, the apparatus also includes means, such as the processor or the like, for matching mapped data with an image associated with the different position, such as an image captured at the different position. See block 32.

As shown in blocks 34-38 of FIG. 2, the apparatus 10, such as the processor 12, of this example embodiment then repeats the process of acquiring map data and navigational information associated with the different position and determining the portion of the image that will be visible at the orientation of the mobile terminal. In addition, the apparatus 10 of this example embodiment includes means, such as the processor 12, the user interface 18 or the like, for matching the position and orientation of the mobile terminal against the map data and for providing for augmentation of the display of at least a portion of the image associated with the different position by causing the navigational information to be presented upon the sidewall surface of the structure within the image captured by the mobile terminal in the different position. See blocks 40 and 42. As such, the image presented to the user and the navigational information associated therewith changes as the orientation and/or position of the mobile terminal correspondingly change. Thus, the user can readily access the augmented reality guidance in order to be accurately directed to the intended destination.

FIG. 2 illustrates a flowchart of an apparatus, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   determining a position of a mobile terminal;
   determining an orientation of the mobile terminal;
   based at least in part upon the position and orientation of the mobile terminal and map data associated therewith, providing for augmentation of a display of at least a portion of an image associated with the position, wherein providing for augmentation of the display of at least the portion of the image comprises causing navigational information to be presented upon a sidewall surface of a structure positioned along a street within the image, wherein the structure is laterally offset to a side of the street within the image;
   determining whether the orientation of the mobile terminal has changed to a different orientation; and
   in an instance in which the orientation of the mobile terminal has changed, providing for augmentation of the display of a different portion of the same image captured by the mobile terminal based at least in part upon the different orientation of the mobile terminal such that different portions of the same image associated with the position are augmented based upon different orientations of the mobile terminal.

2. A method according to claim 1 further comprising:
   determining that the position of the mobile terminal has changed to a different position; and
   providing for augmentation of the display of at least a portion of the image captured by the mobile terminal at the different position by causing the navigational information to be presented upon the sidewall surface of the structure within the image captured by the mobile terminal at the different position.

3. A method according to claim 1 wherein causing navigational information to be presented upon the sidewall surface of the structure within the image comprises causing a directional arrow or a sign to be presented upon the sidewall surface of the structure within the image.

4. A method according to claim 3 wherein causing the directional arrow or the sign to be presented upon the sidewall surface of the structure within the image comprises causing a perspective view of the directional arrow or the sign to be presented upon the sidewall surface of the structure within the image.

5. A method according to claim 1 wherein causing navigational information to be presented upon the sidewall surface of the structure within the image comprises causing navigational information to be presented a predefined distance above street level upon the sidewall surface of the structure within the image.

6. An apparatus comprising at least one processor and at least one memory including computer program code, wherein the memory and computer program code are configured to, with the processor, cause the apparatus to:
   determine a position of a mobile terminal;
   determine an orientation of the mobile terminal;
   based at least in part upon the position and orientation of the mobile terminal and map data associated therewith, provide for augmentation of a display of at least a portion of an image associated with the position, wherein the memory and the computer program code are configured to, with the processor, cause the apparatus to provide for augmentation of the display of at least the portion of the image by causing navigational information to be presented upon a sidewall surface of a structure positioned along a street within the image, wherein the structure is laterally offset to a side of the street within the image;
   determine whether the orientation of the mobile terminal has changed to a different orientation; and
   in an instance in which the orientation of the mobile terminal has changed, provide for augmentation of the display of a different portion of the same image captured by the mobile terminal based at least in part upon the different orientation of the mobile terminal such that different portions of the same image associated with the position are augmented based upon different orientations of the mobile terminal.

7. An apparatus according to claim 6 wherein the memory and the computer program code are further configured to, with the processor, cause the apparatus to:
   determine that the position of the mobile terminal has changed to a different position; and
   provide for augmentation of the display of at least a portion of the image captured by the mobile terminal at the different position by causing the navigational information to be presented upon the sidewall surface of the structure within the image captured by the mobile terminal at the different position.

8. An apparatus according to claim 6 wherein the memory and the computer program code are configured to, with the processor, cause the apparatus to cause navigational information to be presented upon the sidewall surface of the structure within the image by causing a directional arrow or a sign to be presented upon the sidewall surface of the structure within the image.

9. An apparatus according to claim 8 wherein the memory and the computer program code are configured to, with the processor, cause the apparatus to cause the directional arrow or the sign to be presented upon the sidewall surface of the structure within the image by causing a perspective view of the directional arrow or the sign to be presented upon the sidewall surface of the structure within the image.

10. An apparatus according to claim 6 wherein the memory and the computer program code are configured to, with the processor, cause the apparatus to cause navigational information to be presented upon the sidewall surface of the structure within the image by causing navigational information to be presented a predefined distance above street level upon the sidewall surface of the structure within the image.

11. A computer program product comprising at least one non-transitory computer readable medium having program code portions stored thereon, wherein the program code portions are configured, upon execution, to:
determine a position of a mobile terminal;
determine an orientation of the mobile terminal;
based at least in part upon the position and orientation of the mobile terminal and map data associated therewith, provide for augmentation of a display of at least a portion of an image associated with the position, wherein the program code portions configured to provide for augmentation of the display of at least the portion of the image comprise program code portions configured to cause navigational information to be presented upon a sidewall surface of a structure positioned along a street within the image, wherein the structure is laterally offset to a side of the street within the image;
determine whether the orientation of the mobile terminal has changed to a different orientation; and
in an instance in which the orientation of the mobile terminal has changed, provide for augmentation of the display of a different portion of the same image captured by the mobile terminal based at least in part upon the different orientation of the mobile terminal such that different portions of the same image associated with the position are augmented based upon different orientations of the mobile terminal.

12. A computer program product according to claim 11 wherein the program code portions are further configured, upon execution, to:
determine that the position of the mobile terminal has changed to a different position; and
provide for augmentation of the display of at least a portion of the image captured by the mobile terminal at the different position by causing the navigational information to be presented upon the sidewall surface of the structure within the image captured by the mobile terminal at the different position.

13. A computer program product according to claim 11 wherein the program code portions configured to cause navigational information to be presented upon the sidewall surface of the structure within the image comprise program code portions configured to cause a directional arrow or a sign to be presented upon the sidewall surface of the structure within the image.

14. A computer program product according to claim 13 wherein the program code portions configured to cause the directional arrow or the sign to be presented upon the sidewall surface of the structure within the image comprise program code portions configured to cause a perspective view of the directional arrow or the sign to be presented upon the sidewall surface of the structure within the image.

15. A computer program product according to claim 11 wherein the program code portions configured to cause navigational information to be presented upon the sidewall surface of the structure within the image comprise program code portions configured to cause navigational information to be presented a predefined distance above street level upon the sidewall surface of the structure within the image.

* * * * *